D. T. FLEMING.
FRUIT TRIMMING MACHINE.
APPLICATION FILED OCT. 29, 1918.

1,294,890.

Patented Feb. 18, 1919.
2 SHEETS—SHEET 1.

WITNESSES

INVENTOR
D. T. FLEMING
BY
ATTORNEYS

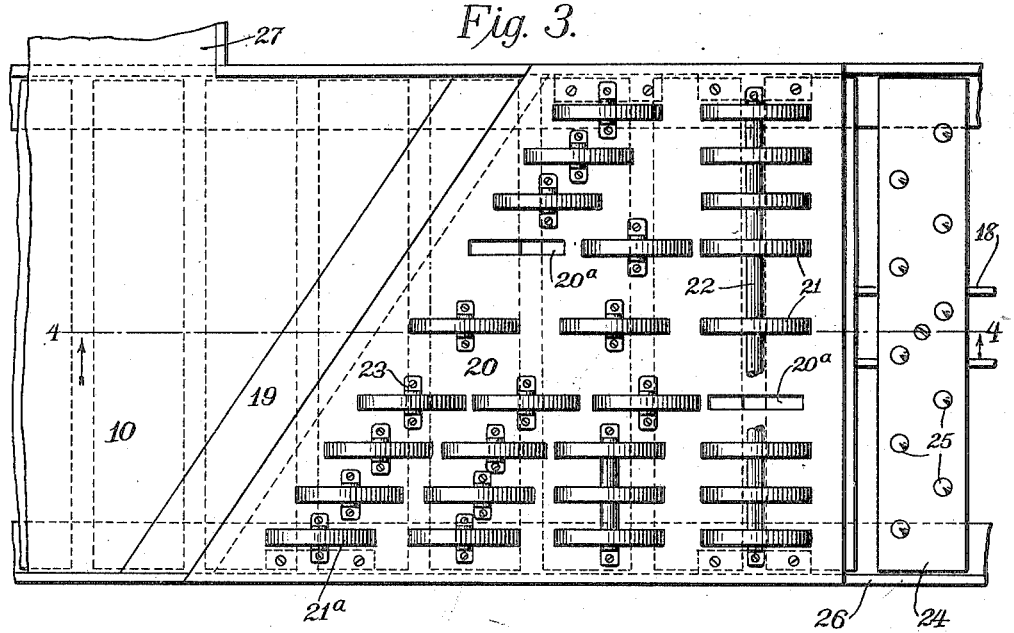
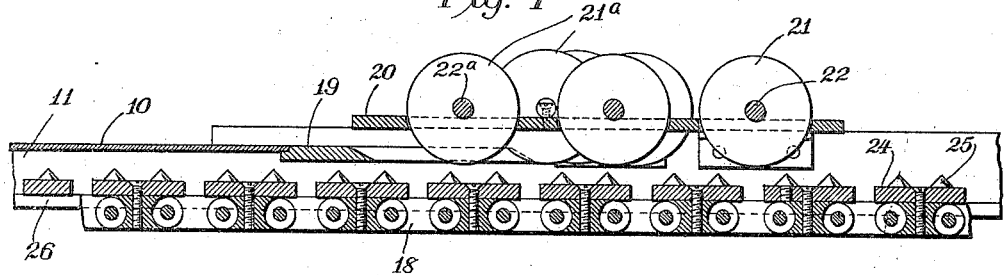

UNITED STATES PATENT OFFICE.

DAVID THOMAS FLEMING, OF HONOKOHAU, TERRITORY OF HAWAII.

FRUIT-TRIMMING MACHINE.

1,294,890. Specification of Letters Patent. Patented Feb. 18, 1919.

Application filed October 29, 1918. Serial No. 260,185.

*To all whom it may concern:*

Be it known that I, DAVID T. FLEMING, a citizen of the United States, and a resident of Honokohau, in the county of Maui, Territory of Hawaii, have invented a new and Improved Fruit-Trimming Machine, of which the following is a description.

My invention relates to machines for trimming the fruit from the peelings of pineapples. A type of machine for the indicated purpose includes a table, an endless traveling feed belt, a knife for trimming off the fruit from the rind, and a grid through which the fruit side of the rind is forced by the belt and presented to the knife while the trimmed rind is carried by the belt beyond the knife to be disposed of in any convenient manner.

My invention is characterized by novel means to coact with the belt in pressing the peel into proper form in presenting the peel to the knife and by a novel form and correlation of the knife, the belt, and the coacting presser means with the purpose of firmly sustaining the peel in position to be effectively trimmed by the knife and with the important purpose also of removing the fruit from the peel to the maximum extent.

Reference is to be had to the accompanying drawings forming a part of this specification, it being understood that the drawings are merely illustrative of one example of the invention.

Fig. 3 is an enlarged fragmentary plan view of part of the machine and showing the embodiment of my invention therein;

Fig. 4 is a longitudinal vertical section on the line 4—4, Fig. 3.

Figure 1:
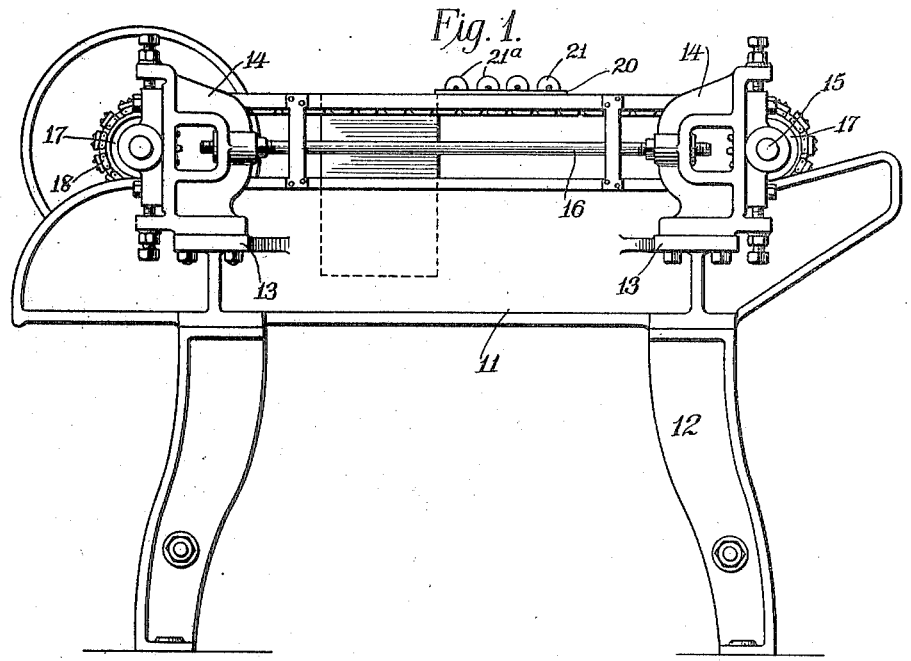
Figure 1 is a side elevation of a machine generally of known form and having my invention embodied therein.
Figure 2:
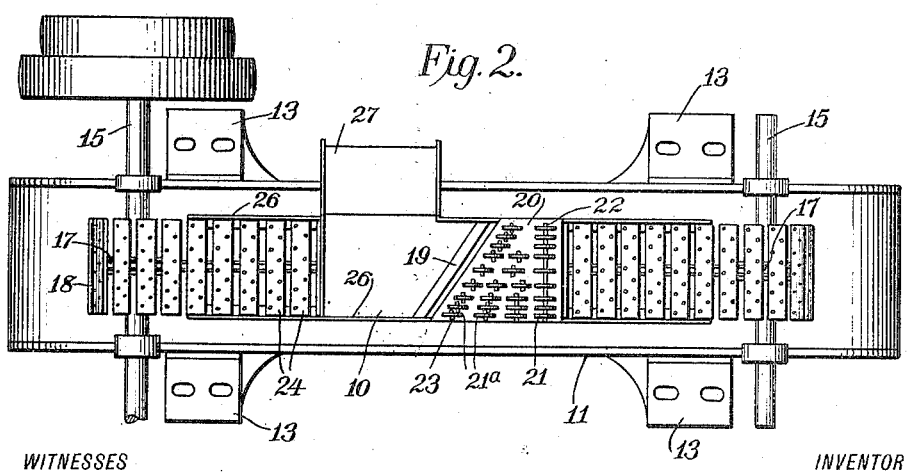
Fig. 2 is a plan view of said machine with parts removed.

In the illustrated example of my invention a table 10 is provided in a frame, designated generally by the numeral 11 and supported on legs 12. In the top of the machine in which my invention is shown as embodied, brackets 13 are provided to receive heads 14 in which shafts 15 have bearings, said heads being connected by a truss bolt 16 and said shafts carry sprocket wheels 17 over which a chain carrier belt 18 runs.

In accordance with my invention the upper run of the belt 18 is the working run and above the same I dispose the table 10 at the front edge of which I provide an obliquely disposed horizontal fixed knife 19. In front of the knife 19 and slightly above the same is a rigid plate 20 carrying a multiplicity of separate presser rollers 21, 21$^a$. The presser rollers are variously disposed over the surface of the plate 20, there being adjacent to one edge of said plate a horizontal series of rollers 21 on a shaft 22 and additional rollers 21$^a$ turning on short shafts 22$^a$, journaled in brackets 23, the respective shafts of the several rollers being on the upper side of the plate 20. The presser rollers extend through individual slots in the plate 20 to turn at the under side approximately in the plane of the knife 19. The belt 18 includes two or more chains running over the sprockets 15 and transverse slats 24 having conical studs 25. In order to rigidly support the slats for traveling in a definite plane beneath the presser rollers 21 and knife 19, I provide side rails 26 at the sides of the rollers and knives and positioned to receive the ends of the slats 24 and firmly sustain the same against sagging as the belt travels beneath the rollers and knife.

With the described arrangement, the fruit peels are placed on the belt 18 with the rind or rough side down and are carried beneath the rollers 21 which, being of narrow width, embed their under sides in the meat of the peels, so that the meat travels above the plane of the knife 19; the rollers at the same time serve to flatten the peels so as to be carried by the belt in flat form against the knife 19 which will shave the fruit from the rind, the fruit passing onto the table 10 to be disposed of in any suitable manner as by being directed laterally onto a chute 27, the belt serving to carry the shaved rinds to an end of the machine to be deposited in any suitable receptacle. Those presser rollers adjacent to the edge of the knife are in an oblique row and there is but a slight distance between the knife and the adjacent oblique row of rollers so that the arrangement enables the knife to effectively shave the fruit from the rind to the maximum extent. The plate 20 terminates in a plane slightly overlapping the knife 19 so that there is a guide throat formed jointly by the knife and the overhanging and overlapping edge of the plate.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A fruit trimming machine including a table, an oblique horizontal knife at an edge of the table, a fixed plate in front of and above the knife and overhanging the latter, a series of separate presser rollers journaled on said plate at the upper side and variously disposed over the surface of the plate, those rollers adjacent to the knife being in an oblique row, said plate having slots through which the rollers extend to the under side of the plate, and said rollers at the bottom turning approximately in the plane of said knife, an endless conveyer belt, the upper, working run of said belt traveling beneath said presser rollers and beneath said knife and table, and means to take the pressure of the rollers on the belt as the latter travels under the rollers.

2. A fruit trimming machine of the class described including a knife, a series of presser rollers in front of the knife and turning at the under sides approximately in the plane of the knife, and a conveyer belt adapted to receive fruit peels and having the working run thereof traveling beneath said rollers and knife in a plane to cause the peels on the belt to be depressed by the rollers as the belt approaches the knife.

DAVID THOMAS FLEMING.

Copies of this patent may be obtained for five cents each, by addressing the "Commissioner of Patents, Washington, D. C."